United States Patent

Korte-Jungermann

[11] Patent Number: 5,964,057
[45] Date of Patent: Oct. 12, 1999

[54] PLANT HOLDER

[76] Inventor: Hans-Werner Korte-Jungermann, Kleinkollenburgstr. 58, D-47877 Willich, Germany

[21] Appl. No.: 08/911,637

[22] Filed: Aug. 14, 1997

[30] Foreign Application Priority Data

Aug. 15, 1996 [DE] Germany .......................... 296 14 710

[51] Int. Cl.⁶ ........................................................ A01G 9/12
[52] U.S. Cl. .............................................................. 47/70
[58] Field of Search .................................... 47/44, 45, 46, 47/47, 66.6, 66.1, 65.5, 66.7, 41.01, 41.11, 904

[56] References Cited

U.S. PATENT DOCUMENTS

| | | | |
|---|---|---|---|
| 425,745 | 4/1890 | Brown | 47/70 |
| 510,524 | 12/1893 | Smith | 47/70 |
| 915,146 | 3/1909 | Woerner | 47/70 |
| 2,014,175 | 9/1935 | Hart | 47/70 |
| 3,481,075 | 12/1969 | Dastoli | 47/45 |
| 5,159,780 | 11/1992 | Molthen | 47/70 |
| 5,179,799 | 1/1993 | Hillestad | 47/45 |

*Primary Examiner*—Thomas Rice
*Attorney, Agent, or Firm*—Mason, Kolehmaien, Rathburn & Wyss

[57] ABSTRACT

The invention relates to a plant holder with several essentially identically shaped elements (2), which are arranged in a vertical position when in use, and at least one supporting ring (3), which is arranged in a horizontal position when in use, which includes easily removable retention devices for retaining several vertical elements (2) along the perimeter of the supporting ring (3) and at heights corresponding to the vertical elements. The vertical elements (2) may exhibit an essentially rectangular profile. Recesses (10) for acceptance of the vertical elements can be arranged along the supporting ring, of which there is at least one, while protrusions (12) can be arranged along the lateral surfaces of the vertical elements which, when assembled, snap into corresponding grooves (11) in the recesses in the supporting ring (3).

6 Claims, 2 Drawing Sheets

1

PLANT HOLDER

BACKGROUND OF THE INVENTION

1. Field of the Invention

The invention relates to a plant holder with several essentially identically shaped elements, which are arranged in a vertical position when in use, and at least one supporting ring, which is arranged in a horizontal position when in use.

2. Background of the Invention

These types of plant holders are used with a plant container into which creeping and climbing plants are planted. These plants grow along the vertical elements and the supporting ring, eventually forming a plant-covered decorative object that corresponds to the outer shape of the plant holder.

A plant holder of the type described above and based on DE-GM 89 144 79 is known in the art and consists of metal vertical elements and supporting rings that are welded or screwed together. For stabilization purposes, the plant holder can be screwed to a base plate or a foundation.

These known plant holders are sold either as kits consisting of individual components or in fully assembled form. However, due to the screw connections involved, the assembly of known kits is both cumbersome and complicated. High packaging and shipping costs are incurred in conjunction with plant holders that are sold in fully assembled form, due to the large volume of the plant holders attributable to regulatory requirements.

SUMMARY OF THE INVENTION

The fundamental objective of the invention is to improve a plant holder of the type mentioned earlier in such a way that it consists of components that are as similar to one another as possible, can be manufactured efficiently, and have a low shipping volume in their unassembled state, and that are easily assembled without tools. Furthermore, the plant holder should be easily attachable to commercial plant containers without the need for tools and should not require being secured to a base plate or foundation for stabilization purposes.

The invention specifies the placement of easily removable—i.e., without the need for tools—retention devices for retaining several vertical elements along the perimeter of the supporting ring and at heights corresponding to the vertical elements. This allows the plant holder to be sold in a compact kit form and to be easily assembled at its final installation location without the need for tools, in that the retention devices are used to attach the vertical elements to the supporting rings. If there are several supporting rings, these rings may vary in diameter to conform to the shape of the vertical elements. The shape of the supporting rings is not necessarily circular; elliptical and polygonal supporting rings are also possible.

According to the invention, it may also be specified that the leading edges of the vertical elements be shaped in such a way as to grip into a plant container and to grip over the upper edge of the plant container. This allows the plant holder to be attached to the plant container without the need for additional means of attachment, such as screws. As the plant container is filled with earth or a similar plant nutrient substratum and is thus relatively heavy, additionally securing the plant holder to a foundation or a base plate is not necessary. Commercial plant holders can be used, as the plant container and the plant holder do not form a fixed unit.

In another form of the invention, it may be specified that the portions of the vertical elements (2) that are located toward the top during use are cambered outward to form an approximately spherical shape. In another form of the invention, it may be specified that one or more supporting rings are designed to hold additional plant containers. This is advantageously achieved in that the edge of the additional plant containers rests against the inner edge of the relevant supporting rings.

BRIEF DESCRIPTION OF THE DRAWING

These and many other objects and advantages of the present invention will become readily apparent from consideration of the following detailed description of the embodiment of the invention shown in the accompanying drawing wherein.

DETAILED DESCRIPTION OF THE PREFERRED EMBODIMENT

Figure 1:
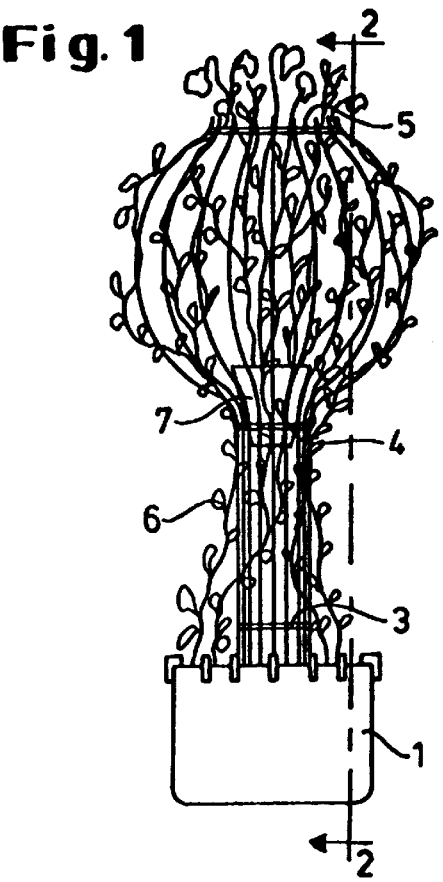
FIG. 1 depicts a plant holder based on the invention in its assembled and plant-covered state.

FIG. 1 depicts a plant holder as described in the invention, in its assembled and plant-covered state, with a plant container 1 filled with earth and with vertical elements 2 placed at regular intervals along the outer perimeter of three circular supporting rings 3,4,5, comprising a lower supporting ring 3 and middle supporting ring 4 of identical diameters, as well as an upper supporting ring 5 of a larger diameter. The vertical elements and the supporting rings are surrounded by climbing plants 6. An additional container 7 containing a plant is located in the middle supporting ring 4. The vertical elements and the supporting rings are made of plastic, which provides weight- and cost-related advantages in comparison to the use of metal. The upper area of the vertical elements is cambered outward to form a spherical shape, with a sufficiently wide opening at its upper end to allow for the introduction or removal of the container 7.

Figure 2:
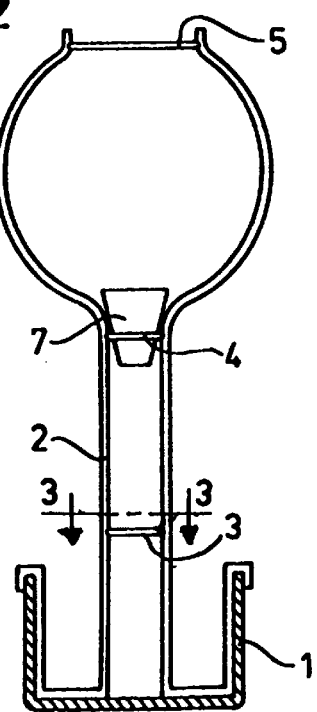
FIG. 2 depicts partial a cross-sectional view of the plant holder depicted in FIG. 1 without the depicted plant and taken along line 2—2 of FIG. 1.

FIG. 2 depicts a cross-sectional view of the plant holder depicted in FIG. 1. In this case, it does not contain a plant. As is evident in the figure, the means of securing the plant holder to the plant container consist, on the one hand, of the vertical elements gripping into the plant container, so that they rest against the container floor and the inner walls of the container and, on the other hand, of the vertical elements gripping around the side walls of the container. The plant holder is also supported by the earth or nutrient substratum in the plant container.

Figure 3:
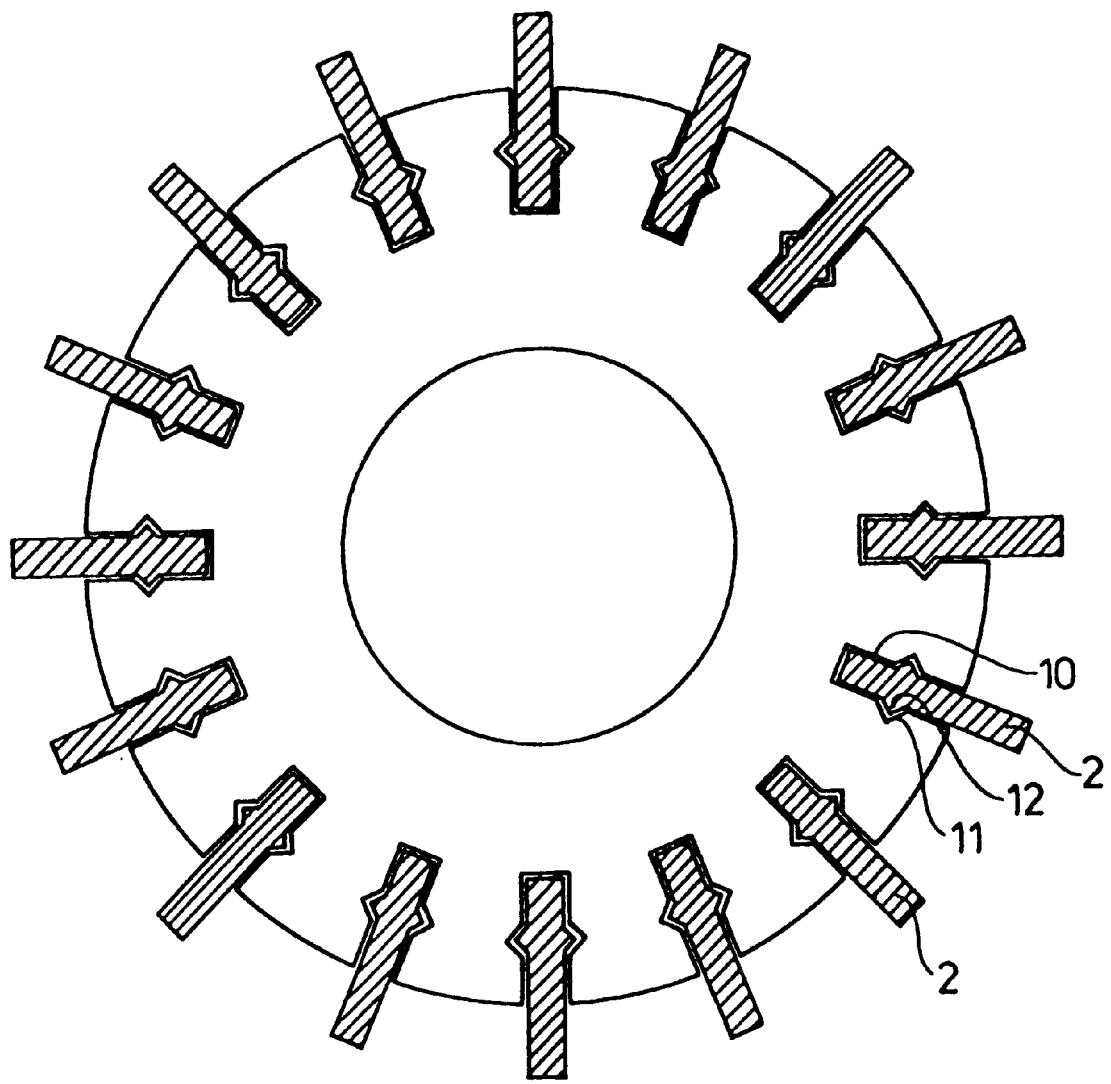
FIG. 3 provides a detailed depiction (partially in cross section taken along line 3—3 of FIG. 2) of the supporting ring, as described in the invention, with retention devices for the vertical elements.

FIG. 3 provides a detailed depiction of a supporting ring, as described in the invention, with retention devices for the vertical elements. Evenly spaced recesses 10 for the insertion of vertical elements 2 with rectangular cross-sections are located along the outer perimeter of the supporting ring 3. Protrusions 12 located along the lateral surfaces of the vertical elements engage matching grooves 11 in the recesses of the supporting ring, thus allowing the vertical elements to be snapped into place.

Obviously, many modifications and variations of the present invention are possible in light of the above teachings. Thus, it is to be understood that, within the scope of the appended claims, the invention may be practiced otherwise than as specifically described above.

What is claimed and desired to be secured by letters patent of the united states is:

1. A plant holder comprising:

a plurality of essentially identically shaped elongated holding elements extending in a vertical orientation when in use; and at least one supporting ring for supporting said plurality of holding elements, said supporting ring being in a horizontal orientation when in use, being generally flat and including retention slots extending from the outer perimeter of said supporting ring toward the center thereof, said holding elements being disposed in said retention slots to retain said holding elements in said vertical orientation relative to said supporting ring.

2. A plant holder as set forth in claim 1 wherein a lower end of each of said holding elements has a gripping portion to grip into a plant container and over an upper edge of a side wall of said plant container.

3. A plant holder comprising:

a plurality of essentially identically shaped elongated holding elements extending in a vertical orientation when in use, each of said holding elements being essentially rectangular in profile; and at least one supporting ring for supporting said plurality of holding elements, said supporting ring being in a horizontal orientation when in use and includes retention devices extending from the perimeter of said supporting ring, said holding elements being disposed in said retention devices to retain said holding elements in said vertical orientation relative to said supporting ring, each of said retention devices including a recess with grooves along the side edges thereof, each of said recesses extending from the outer periphery of said supporting ring for acceptance of said holding elements and each of said holding elements having protrusions projecting from side elongated surfaces of said holding elements which become lodged in corresponding grooves in said recesses in said supporting ring.

4. A plant holder as in claim 1 wherein top portions of said holding elements are cambered outward to form an approximately spherical shape.

5. A plant holder as set forth in claim 1 including a plurality of supporting rings, at least one of said supporting rings adapted to hold an additional plant container.

6. A plant holder comprising:

a plurality of essentially identically shaped elongated holding elements extending in a vertical orientation when in use, a lower end of each of said holding elements having a gripping portion to grip into a plant container and over an upper edge of a side wall of said plant container and extends to said gripping portion along said side wall of said plant container and along a bottom wall of said plant container; and at least one supporting ring for supporting said plurality of holding elements, said supporting ring being in a horizontal orientation when in use and includes retention devices extending from the perimeter of said supporting ring, said holding elements being disposed in said retention devices to retain said holding elements in said vertical orientation relative to said supporting ring.

* * * * *